United States Patent [19]

Stork

[11] Patent Number: 4,921,566

[45] Date of Patent: May 1, 1990

[54] APPARATUS FOR THE LAMINATING AND CUTTING OF PHOTORESIST WEBS

[75] Inventor: Martin Stork, Muehlheim, Fed. Rep. of Germany

[73] Assignee: Hoechst Aktiengesellschaft, Frankfurt am Main, Fed. Rep. of Germany

[21] Appl. No.: 263,530

[22] Filed: Oct. 27, 1988

[30] Foreign Application Priority Data

Oct. 28, 1987 [DE] Fed. Rep. of Germany ....... 3736509

[51] Int. Cl.$^5$ ............................................. B32B 31/18
[52] U.S. Cl. .................................. 156/354; 156/355; 156/501; 156/522; 156/555
[58] Field of Search ................................ 156/353–355, 156/521, 522, 556

[56] References Cited

U.S. PATENT DOCUMENTS

| | | | |
|---|---|---|---|
| 2,760,414 | 8/1956 | Cornock et al. | 156/521 X |
| 2,818,908 | 1/1958 | Byrnes | 156/522 |
| 4,214,936 | 7/1980 | Del Bianco | 156/302 |
| 4,585,509 | 4/1986 | Obayashi | 156/522 X |
| 4,659,419 | 4/1987 | Miyaki | 156/522 |
| 4,717,441 | 1/1988 | Seki et al. | 156/522 |
| 4,743,325 | 5/1988 | Miyake | 156/522 X |
| 4,772,353 | 9/1988 | Weiss | 156/522 X |

FOREIGN PATENT DOCUMENTS

| | | |
|---|---|---|
| 0040842 | 12/1981 | European Pat. Off. . |
| 0040843 | 12/1981 | European Pat. Off. . |
| 0041642 | 12/1981 | European Pat. Off. . |
| 0213555 | 3/1987 | European Pat. Off. . |
| 3538117 | 4/1985 | Fed. Rep. of Germany . |

Primary Examiner—David Simmons
Attorney, Agent, or Firm—Foley & Lardner, Schwartz, Jeffery, Schwaab, Mack, Blumenthal & Evans

[57] ABSTRACT

Apparatus comprising a feed carriage which can traverse back and forth in the running direction A of a base. Two cutting units are arranged on the feed carriage, which units consist of lifting cylinders to which vacuum bars and holding beams with cutting bands are fixed respectively. Photoresist webs to be laminated onto the base are advanced by a pair of transport rollers by way of deflection rollers and drawn to the vacuum bars which are lowered and raised, respectively, in the direction of the base in order to press the photoresist webs onto the two sides of the base. An optical sensor detects the front and rear edges of each base and controls the moving together and apart of the vacuum bars, the application of negative pressure to the vacuum bars, as well as the neutralizing of the negative pressure, and the cutting movement of the cutting bands.

12 Claims, 3 Drawing Sheets

4,921,566

APPARATUS FOR THE LAMINATING AND CUTTING OF PHOTORESIST WEBS

BACKGROUND OF THE INVENTION

The invention relates to an apparatus for the laminating and cutting of photoresist webs, which are fed by transport rollers to two sides of a base, which runs through the nip of two laminating rolls, with movable vacuum bars for drawing and firmly holding the photoresist webs, and with cutting devices for making a parallel cut of the photoresist webs during the laminating operation.

Apparatus for laminating and cutting photoresist webs is known from EP-A2-0 213 555 and makes possible the cutting of photoresist webs into photoresist sheets of defined size as well as the fold-free laminating of the photoresist sheets on flexible and rigid base materials, for example blank circuit boards. This known apparatus for cutting and laminating is integrated into a movable assembly of a laminator, so that cutting and laminating can be performed without interruption of the laminating operation. In the case of this apparatus, the photoresist webs are drawn by means of negative pressure over their entire width against the front edge of vacuum bars, these vacuum bars being able to traverse back and forth obliquely to the running direction of the base material. The vacuum bars with the photoresist webs adhering to the front edge of these are advanced in the direction of the laminating rolls to such an extent that the photoresist webs together with the base material are taken up by the driven laminating rolls, with simultaneous advancement of the photoresist webs by the transport rolls, and the laminating begins. When the photoresist webs are taken up by the laminating rolls, the vacuum bars are returned to their initial position. At the same time, two cutting knives carry out a parallel cut on both photoresist webs, without stopping of the laminating operation being necessary during the cutting operation.

EP-A1 No. 40 842, No. 40 843 and No. 41 642 disclose laminating processes in which a substrate or a layer base is laminated on both sides with a dry resist, under pressure. The dry resist is drawn from a supply roll for the respective side of this layer base, for example, a circuit board, which is to be laminated and the two dry resist films with the layer base sandwiched between them are fed to the nip of a pair of laminating rolls. Subsequently, the coated layer bases are individualized by means of a cutting apparatus, i.e. the photoresist webs applied to both sides of the layer bases are cut through.

U.S. Pat. No. 4,214,936 relates to a laminating apparatus in which continuously progressing boards are contact-heated and are laminated on both sides. As soon as a sensor detects the rear edge of the preheated board before its entry into the laminating roll nip, the laminating rolls are stopped after a certain delay time, which makes it possible for the rear edge of the board to pass the laminating nip. When the front edge of the next board is detected, the laminating rolls begin to run once again and the board entering the nip is laminated. The photoresist webs applied to both sides of the board are fed to the laminator as an endless web, and the laminating produces a continuous strip of two photoresist layers, between which the boards are in each case enclosed at an equal spacing. The bonding length of the resist layers between two boards may be, for example, up to 18 mm. The separation of boards from one another is performed in two cutting operations along the rear edge of the front board and along the front edge of the following board. Frequently, even three cutting operations are necessary since, in the first cut, initially only the connecting piece of the photoresist webs between two boards is cut through and subsequently the dry resist layers protruding beyond the front and rear edges are cut off only during finishing.

German Offenlegungsschrift No. 3,538,117 discloses a separating apparatus for boards, with which the continuous photoresist strip, which is laminated onto spaced-apart boards, is cut along the width thereof. In a holding device of the separating apparatus, a cross-cutting device is fixed, which comprises two knife holders with mutually parallel knives, which can be moved apart and together and which, during the crossing movement, cut through the photoresist strip along the rear edge and the front edge of two successive boards in a parallel double cut. This separating apparatus is an independent unit which is arranged downstream of the laminating apparatus.

SUMMARY OF THE INVENTION

It is an object of the present invention to provide an apparatus for the cutting to size of photoresist webs to be laminated onto one or both sides of a base thus providing an exact cut, executed perpendicularly to the photoresist webs, without interruption of the laminating operation.

A further object of the invention resides in the provision of a method for cutting to size of photoresist webs and for laminating them onto one or both sides of a base.

In one aspect of the present invention, there has been provided an apparatus for laminating and cutting photoresist webs, comprising a pair of laminating rolls; means for moving a base along a path in a running direction toward the laminating rolls; a feed carriage; means for moving said feed carriage back and forth along the path; a pair of opposed cutting units, each cutting unit mounted on opposite sides of the path and movable toward and away from each other and each including a vacuum bar and a cutting band; means on both sides of the path for transporting and guiding a photoresist web to be laminated to the base, each web being guided adjacent a respective one of the vacuum bars; means for sensing a front and rear edge of the base moving along the path and for generating a signal indicative of passage of each of the front and rear edges of the base; and control means for controlling movement of said cutting units toward and away from each other, said control means being connected to the sensing and signal generating means for controlling movement of the cutting units in response to said signals.

The foregoing and other aspects of the present invention will become apparent from the following detailed description of the invention when considered in conjunction with the accompanying drawing Figures. It is to be expressly understood, however, that the drawing Figures are not intended as a definition of the invention but are for the purpose of illustration only.

BRIEF DESCRIPTION OF THE DRAWING FIGURES

DETAILED DESCRIPTION OF THE PREFERRED EMBODIMENTS

In the present invention two cutting units, equipped with vacuum bars and cutting bands, are arranged on a feed carriage, which can traverse back and forth in the running direction of the base. A sensor detects the front and rear edges of the base, and is connected to a pulse transmitter and, thereby, controls the lifting cylinders for the moving apart and together of the cutting units perpendicularly with respect to the running direction of the base.

The vacuum bars are fixed to piston rods of the lifting cylinders. Proximity switches, which are arranged at a small distance parallel to the piston rods, are switched by the movements of the piston rods. The switching pulses of the proximity switches end the negative pressure in the vacuum bars at the reversing and/or holding points of the moving together and apart, respectively, of the vacuum bars and switch over to the moving apart of the vacuum bars or stop the movement apart of the vacuum bars.

The upper and the lower cutting band is in each case fixed to a holding beam. The holding beams are connected to piston rods of lifting cylinders. The cutting bands assume their initial position transverse to the running direction of the base on the level of the moved-apart upper and lower vacuum bar. The cutting movement of the cutting bands perpendicular to the running direction of the base (up to 10 mm) is shorter than the distance from the initial position to the path of the base.

Advantageously, both one-sided and two-sided laminating of the base, and a satisfactory cutting of the photoresist webs is ensured without a flaking or splintering of the photoresist layers occurring at the cut edges, as is generally the case with an oblique line of cut.

Figure 1:
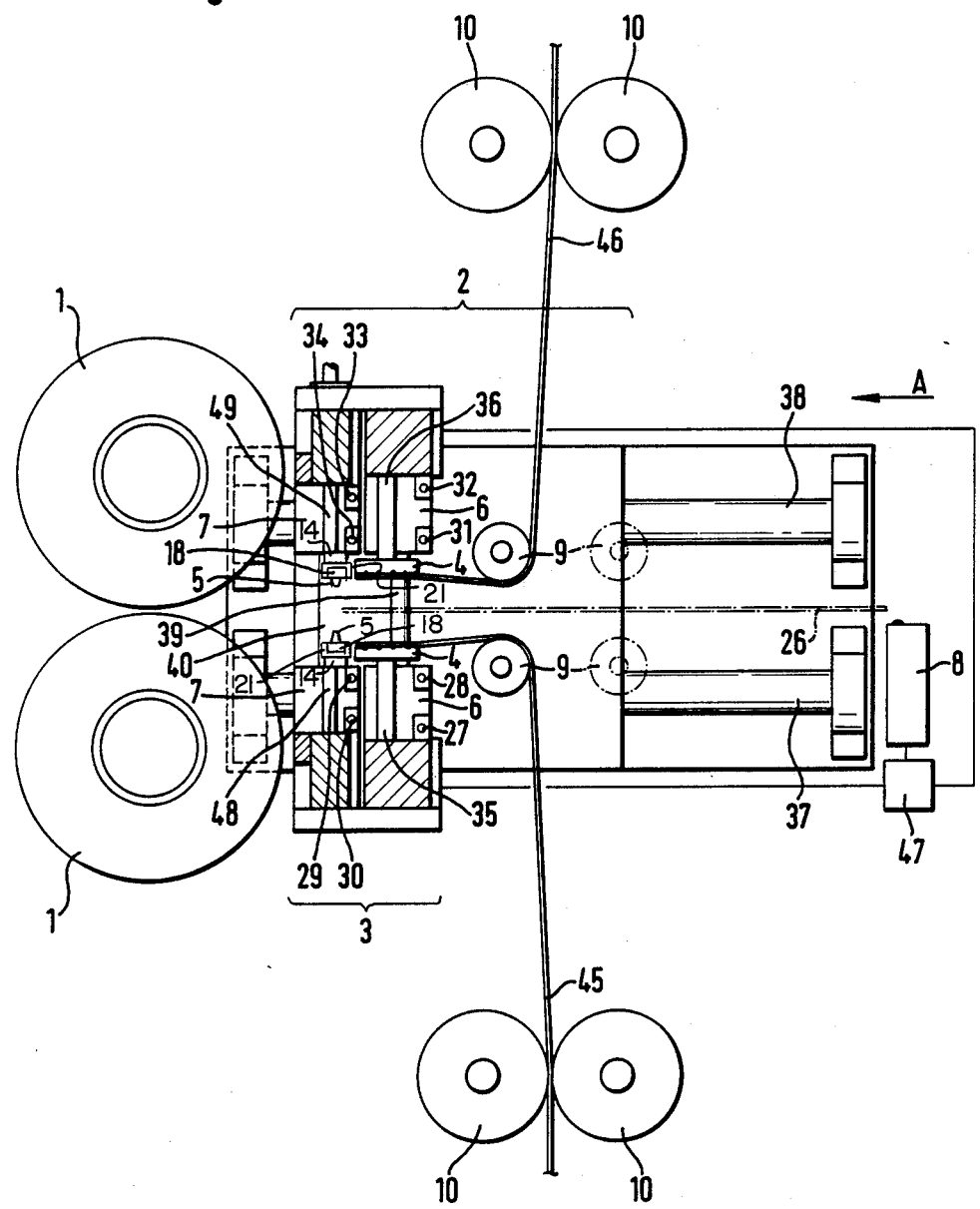
FIG. 1 is a side elevational view illustrating one embodiment of the present invention.

An essential component of the apparatus for the laminating and cutting of photoresist webs in the form of photoresist strips 45, 46 is a feed carriage 2, which can traverse back and forth in a running direction A of a horizontally led base 26. The photoresist strips 45, 46 are drawn off of supply rollers (not shown) and in each case advanced through between a pair of transport rollers 10, 10 and deflected over deflection rollers 9, 9 from their vertical direction to a horizontal direction. The transport rollers 10 feed the photoresist strips 45, 46 over the deflection rollers 9 to vacuum bars 4, 4, which are arranged parallel to and above and below the path of the base 26. On the feed carriage 2 there are two cutting units 3, 3, which comprise the vacuum bars 4, 4 and cutting bands 5, 5. In FIG. 1, the deflection rollers 9, 9 are drawn by solid lines in the advanced position of the feed carriage 2, while these deflection rollers 9, 9 are represented by broken lines in the retracted position of the feed carriage 2.

The vacuum bars 4, 4 are fixed to piston rods 35, 36 of lifting cylinders 6, 6, of which one is arranged above and one below the path of the base 26 on the feed carriage 2. At a small distance, there are arranged parallel to the piston rods 35 and 36 proximity switches 27, 28, 31 and 32, respectively, which are switched by the movements of the piston rods 35 or 36. As will be explained in more detail below, the switching pulses of the proximity switches 28, 31 and 27, 32, respectively, cause a negative pressure in the vacuum bars to switch over to normal pressure at the reversing and/or holding points of the moving together or apart of the vacuum bars and, furthermore, switching occurs in response to the moving apart of the vacuum bars and the movement apart of the vacuum bars is stopped.

The feed carriage 2 moves along two carriage guides 37, 38 and is made to traverse back and forth by a drive motor (not shown). In running direction A there is, upstream of the feed carriage 2, an optical sensor 8, which detects the front and rear edges of each base 26. This optical sensor 8 is connected to a pulse transmitter 47, by the pulses of which the lifting cylinders 6, 6 are controlled for the moving apart and together of the cutting units 3, 3 or of the vacuum bars 4, 4, respectively, perpendicular to the running direction A of the base 26.

In the direct vicinity of the vacuum bars 4, 4 there are upper and lower cutting bands 5, 5, which are in each case electrically heated. Each of the two cutting bands 5, 5 is fixed to an associated holding beam 14, 14, each of which is connected respectively to piston rods 48, 49 of further lifting cylinders 7, 7. These lifting cylinders 7, 7 are arranged parallel to the lifting cylinders 6, 6, on which the vacuum bars 4, 4 are attached. In their initial positions, the cutting bands 5, 5 are on the level of the moved-apart upper and lower vacuum bars 4, 4. The cutting bands 5, 5 extend transversely to the running direction A of the base 26 over the width of the latter and their cutting movement is performed perpendicularly to the running direction A of the base 26. The amount of the cutting movement is up to 10 mm; this amount is shorter than the distance of the initial position of the individual cutting band from the path of the base 26. In other words, this means that the cutting bands are not lowered or raised, respectively, as far as the base during the cut.

Parallel to the piston rods 48, 49 of the lifting cylinders 7, 7 are arranged further proximity switches 29, 30 and 33, 34, respectively, which are switched by the movements of the piston rods. The switching pulses of these proximity switches control the raising and lowering, respectively, of the cutting bands 5, 5 after parallel cuts of the photoresist strips 45, 46 are completed and stop the cutting bands 5, 5 in their initial positions after the return from the cutting positions. The proximity switches 27 to 34 may, for example, be small dry-reed switches.

In order to prevent a tilting of the vacuum bars 4, 4 during their movement, a linear guide with a guide shaft 39 for the vacuum bars 4, 4 is arranged in each case parallel to both sides of the piston rods 35, 36 of the lifting cylinders 6, 6. For the same reason, there are linear guides with guide shafts 40 for the cutting bands 5, 5 parallel to both sides of the piston rods 48, 49 of the lifting cylinders 7, 7, so that the cutting bands are guided in a straight line during the cutting operation.

In the running direction A of the base 26, there are arranged downstream of the feed carriage 2 an upper and lower laminating roll 1, through the nip of which the base 26 is passed together with the laminated-on photoresist strips 45, 46.

Figure 2:
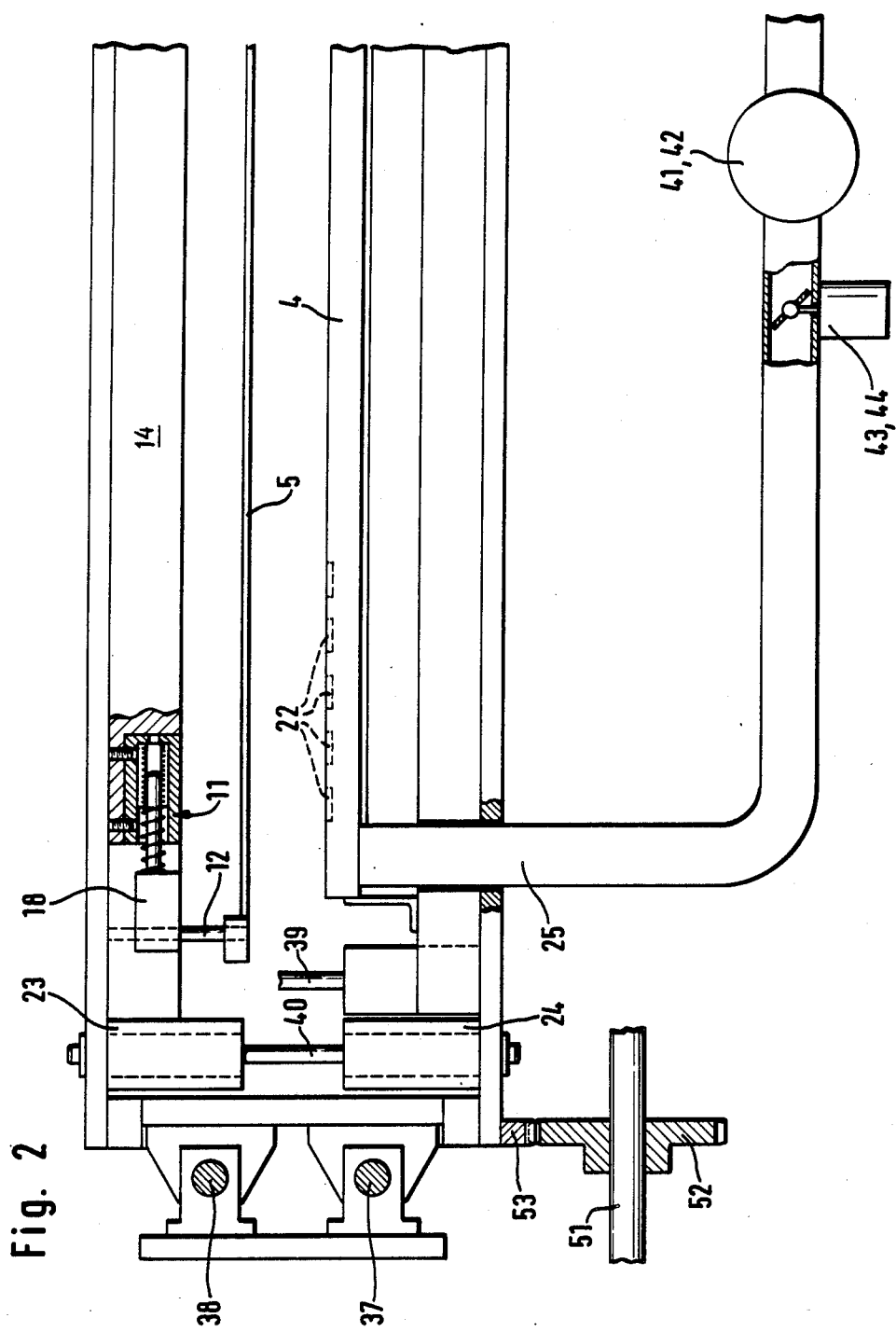
FIG. 2 is a frontal view of the embodiment of FIG. 1, with certain parts eliminated for clarity.

As can be seen from FIG. 2, the individual vacuum bar 4 is provided with suction holes 22, to which, for example, negative pressure is applied in order to draw and hold the photoresist strip thereagainst. Each of the two vacuum bars 4 is connected by means of a vacuum line 25 to a vacuum blower 41 and 42, respectively. In each vacuum line 25 there is a vacuum valve 43 and 44, respectively. The blowers 41, 42 are constantly in operation when in the switched-on state. Opening of the pneumatically actuated valves 43, 44 has the effect of immediately generating an adequate negative pressure, so that the photoresist strip is drawn against the bar 4 and held firmly.

Underneath the feed carriage 2 there is a drive shaft 51, on which a toothed wheel 52 is seated, which meshes with a toothed rack 53 on the underside of the feed carriage 2 and causes the latter to traverse back and forth according to the direction of rotation of the drive shaft 51. In FIG. 2, the guide shafts 39 and 40 are shown, the guide shaft 40 being guided in linear ball bearings 23, 24. One end of the cutting band 5 is fixed by means of an insulator 12 to a clamping block 18, which is in connection with a cutting band clamping unit 11, connected to the holding beam 14.

Figure 3:
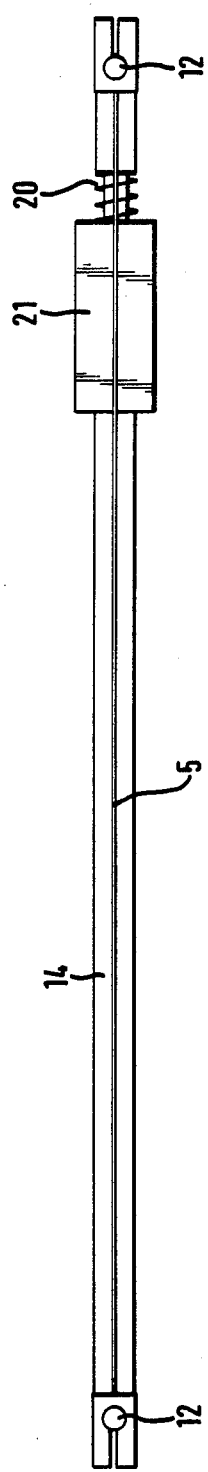
FIG. 3 is a plan view illustrating an embodiment of a cutting band with an associated holding beam of the present invention.
Figure 4:
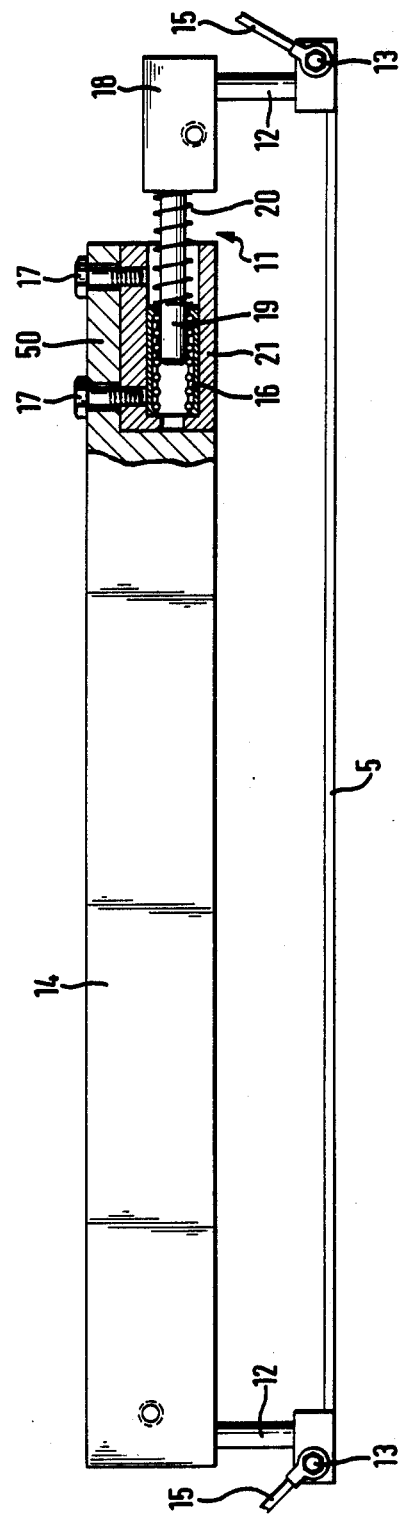
FIG. 4 is a frontal view of the embodiment of FIG. 3.

FIG. 3 shows a plan view of a cutting band 5, which is fixed to the holding beam 14, which has at the one end a holding device 21 for a linear ball bearing 16. As can be seen from FIG. 4, each of the two cutting bands 5, 5 is connected by means of insulators 12, 12 to the associated holding beam 14. At the end pieces of the insulators 12, 12 there are electric terminals 13 for the power supply 15 for the heating of the cutting bands 5, 5. One of the insulators 12 is fixed directly to the holding beam, while the other insulator 12 is connected, by means of the cutting band clamping unit with the holding beam 14. The cutting band clamping unit 11 comprises the clamping block 18 and a hardened shaft 19, on which a compression spring 20 is pushed. The one insulator 12 is attached to the clamping block 18. The insulators 12, 12 prevent a voltage flashover between the cutting band 5 and the holding beam 14.

For the holding beam 14 to receive the holding device 21, the holding beam 14 has at one end face a cut-out, which is bounded by a web 50 of the holding beam 14. The holding device 21 is fitted into this cut-out and connected to the web 50 by screws 17, 17. In longitudinal direction of the holding beam 14 there is in the holding device 21 a linear ball bearing 16, into which the shaft 19 is partially pushed. This linear ball bearing 16, just like the other linear ball bearings, are so-called linear ball boxes, in the circumference of which balls are recessed in the longitudinal direction. The balls guide a pushed-in shaft exactly in a straight line with very little friction. The compression spring 20 bears with one end against the end face of the linear ball bearing 16 and with the other end against the clamping block 18. If, for example, the cutting band 5 stretches due to heating resulting from an electric current, the longitudinal extension of the cutting band 5 is compensated by the compression spring 20, which then keeps pushing the clamping block 18 with the insulator 12 to the right in FIG. 4 until the cutting band 5 is taut. If, on the other hand, the cutting band 5 contracts when the electric current supply is switched off, the clamping block 18 presses the shaft 19, against the spring force of the compression spring 20, deeper into the linear ball bearing 16, since the end face of the shaft 19 has sufficient clearance within the linear ball bearing 16. The cutting band clamping unit 11 ensures that the cutting band 5 is stretched tight at all times.

In the initial position, during operation of the apparatus, the feed carriage 2 is in its rear position, in which the position of the deflection rollers 9, 9 is shown in broken lines in FIG. 1. The vacuum bars 4, 4 are moved apart, have negative pressure applied to them and hold firm the photoresist strips 45, 46. The blowers 41, 42 permanently generate a suction pressure. As soon as the valves 43, 44 open into the vacuum lines 25, negative pressure builds up in the vacuum lines 25 and in the vacuum bars 4, 4, so that the adjacent photoresist strips 45, 46 are drawn to bars 4, 4 by means of suction holes 22. Base or board 26 is moved in running direction A on a transport roller track (not shown) in the direction of the laminating rolls 1, 1. The optical sensor 8 detects the front edge of base 26. The pulse of the optical sensor 8 triggers the pulse transmitter 47, which may be arranged for example on the shaft of the main motor (not shown). This pulse transmitter 47 is an incremental pulse transmitter, which counts digitally forward after receiving the triggering pulse from the sensor 8, i.e. counts up as far as a fixed set value. If this numerical value is reached, the pulse transmitter emits a signal, which actuates the lifting cylinders 6, 6 for the raising and lowering of the vacuum bars 4, 4 perpendicularly to the running direction A of the base 26. Thus, the vacuum bars 4, 4 with the photoresist strips 45, 46 drawn and held thereto are lowered or raised, respectively, in the direction of the base 26. At the same time the feed carriage 2 begins moving forward, i.e., in the direction of the laminating rolls 1, 1, and the transport rollers 10, 10 undertake the further advancement of the photoresist strips 45, 46. The vacuum bars 4, 4 press the photoresist strips 45, 46 onto the base 26, and the laminating operation begins. The negative pressure in the vacuum bars 4, 4 is neutralized, i.e. the vacuum is switched off, and the vacuum bars 4, 4 move apart into their initial positions. At the same time, the feed carriage 2 returns into its initial position, and the base 26 with the laminated-on initial strip areas of the photoresist strips 45, 46 is transported through the laminating rolls 1, 1. These laminating rolls are heated, so that the heat and the contact pressure of the laminating rolls cause the photoresist strips to be laminated onto both sides of the base 26.

In the sequence of movements described above of the vacuum bars 4, 4, the neutralization of the vacuum and the moving apart of the vacuum bars 4, 4 are controlled by the proximity switches 28, 31 and the stopping of the vacuum bars is controlled by the proximity switches 27, 32. While moving out, the piston rods 35, 36 of the lifting cylinders 6, 6 pass the proximity switches 28, 31 and trigger in them signals which, for example, are fed to electromagnetically actuate the opening of valves 43, 44. As a result, the vacuum in the vacuum lines 25 and in the vacuum bars 4, 4 is neutralized. Furthermore, the signals of the two proximity switches 28 and 31 reverse the movements of the piston rods 35, 36, so that the vacuum bars 4, 4 are moved apart. As soon as the piston rods 35, 36 pass the two other proximity switches 27, 32, switching pulses are triggered in the latter, which pulses have a control function and indicate that the vacuum bars 4, 4 are returned to their initial position.

The optical sensor 8 also detects the rear edge of the base 26, which is further transported by the laminating rolls 1, 1. The incremental pulse transmitter 47 then begins to count backward, i.e. to count back from the fixed set value to zero again. To summarize, this means that, after registering the front edge of the base 26, the incremental pulse transmitter 47 counts up from 0 to 600 pulses, this value of 600 pulses being predetermined by a first set-value generator. After reaching the 600 pulses, the vacuum bars 4, 4 are raised or lowered, respectively, and the laminating of the photoresist strips 45, 46 onto the base 26 begins, generally a front projection of the base 26 with respect to the photoresist strips 45, 46 being maintained in the form that, for example, the distance from the front edge of the base to the front edges of the photoresist strips is 5 to 15 mm. Since the sensor 8 is arranged a certain distance upstream of the vacuum bars 4, 4 in running direction A, the 600 pulses correspond to the distance which the base 26 or its front edge has travelled from the sensor 8 by the beginning of the laminating-on of the photoresist strips. The fixed set value of 600 pulses is, for example, also the starting point for a second set-value generator. As soon as the sensor 8 detects the rear edge of the base 26, the counter driven by the incremental pulse transmitter 47 begins to count backward from the initial value 600 down to zero. If, for example, the cut of the photoresist strips is performed when the value zero is reached, the rear edges of the laminated-on photoresist sheets finish at the rear edge of the base 26, i.e. there is no rear projection of the base 26 at all. If, on the other hand, the second set-value generator is set to 550 pulses and counting back to zero begins from this value, a rear projection of the base 26 of a few millimeters is produced. It is true in general that the higher the predetermined set value for the detecting of the front edge of the base 26, i.e. the greater the upward discrepancy from the initial value of, for example, 600 pulses, the greater the forward projection of the base 26 with respect to the front edges of the photoresist strips 45, 46. Conversely, it is true for the predetermined set value for the detecting of the rear edge of the base 26 that the rear projection becomes greater as the set value becomes smaller in comparison with the initial value of, for example, 600 pulses. Of course, the initial value may also be lower or higher than 600 pulses. Due to the variability in the setting of the set values for the counter, which compares the counting pulses of the pulse transmitter 47 with the redetermined set values of the set-value generator and, if they coincide, triggers switching signals for the vacuum bars or the cutting devices, variously long front and rear projections can be achieved as required for each individual base 26. After each counting operation for the individual base 26, the counter is reset to zero, so that any pulse counting errors, which could add up with a number of bases, are avoided.

As soon as pulse transmitter 47 has reached the initial value during backward counting, a vacuum is again applied to the vacuum bars 4, 4 and the feed carriage 2 moves forward. The transport rollers 10, 10, which advance the photoresist strips 45, 46 are then stopped.

In the position last reached, the feed carriage 2 is in its forward position (shown by solid lines in FIG. 1) and negative pressure is applied to the moved-apart vacuum bars 4, 4, so that they hold the photoresist strips 45, 46 firmly, while the two pair of transport rollers 10, 10 stop the advancement of the photoresist strips. The piston rods of the lifting cylinders 7, 7, to which the holding beams 14, 14 with the cutting bands 5, 5 are fixed, move out, so that the two cutting bands sever the firmly held photoresist strips. When the piston rods pass the proximity switches 29, 34, pulses are triggered in these proximity switches, which pulses stop the raising and lowering, respectively, of the cutting bands and initiate a reversal in the movement of the piston rods. At the same time, the feed carriage 2 is pushed back into its initial or waiting position. As soon as the piston rods pass the other proximity switches 30, 34 during entry into the lifting cylinders 7, 7, the pulses of these proximity switches stop the further movement of the cutting bands, which are in their waiting position.

The dual design of the proximity switches above and below the path of the base 26 makes possible, optionally, a single-sided or double-sided laminating-on of a photoresist strip or of two photoresist strips.

What is claimed is:

1. Apparatus for the laminating and cutting of photoresist webs, comprising:
   a pair of laminating rolls;
   means for moving a base along a path in a running direction toward the laminating rolls;
   a feed carriage;
   means for moving said feed carriage back and forth along the path;
   a pair of opposed cutting units, each cutting unit mounted on opposite sides of the path and movable toward and away from each other and each including a vacuum bar and a cutting band;
   means on both sides of the path for transporting and guiding a photoresist web to be laminated to the base, each web being guided adjacent a respective one of the vacuum bars;
   means for sensing a front and rear edge of the base moving along the path and for generating a signal indicative of passage of each of the front and rear edges of the base;
   control means for controlling movement of said cutting units toward and away from each other, said control means being connected to the sensing and signal generating means for controlling movement to the cutting units in response to said signals; and
   wherein the control means includes first pistons connected to the vacuum bars, wherein first proximity switches are disposed adjacent the first pistons, and wherein switching pulses of the first proximity switches further control the presence of vacuum in and movement of the vacuum bars.

2. Apparatus according to claim 1, wherein the cutting bands are each connected to a respective holding beam, wherein the holding beams are each connected to second pistons, wherein the cutting bands assume an initial position transverse to and at a distance from the path, the initial position being adjacent the vacuum bars when the vacuum bars are moved away from each other, and wherein cutting movement of the cutting bands is less than the distance between the initial position and the path.

3. Apparatus according to claim 1, further comprising:
   a linear guide for the vacuum bars arranged parallel to the first pistons.

4. Apparatus according to claim 1, wherein the vacuum bars are connected by vacuum lines and vacuum valves to vacuum blowers which run constantly during operation of the apparatus.

5. Apparatus according to claim 4, wherein negative pressure in the vacuum bars is built up in response to closing the vacuum valves.

6. Apparatus for the laminating and cutting of photoresist webs, comprising:
   a pair of laminating rolls;
   means for moving a base along a path in a running direction toward the laminating rolls;
   a feed carriage;

means for moving said feed carriage back and forth along the path;

a pair of opposed cutting units, each cutting unit mounted on opposite sides of the path and movable toward and away from each other and each including a vacuum bar and a cutting band;

means on both sides of the path for transporting and guiding a photoresist web to be laminated to the base, each web being guided adjacent a respective one of the vacuum bars;

means for sensing a front and rear edge of the base moving along the path and for generating a signal indicative of passage of each of the front and rear edges of the base;

control means for controlling movement of said cutting units toward and away from each other, said control means being connected to the sensing and signal generating means for controlling movement of the cutting units in response to said signals; and wherein the cutting bands are each connected to a respective holding beam, wherein the holding beams are each connected to second pistons, wherein the cutting bands assume an initial position transverse to and at a distance from the path, the initial position being adjacent the vacuum bars when the vacuum bars are moved away from each other, and wherein cutting movement of the cutting bands is less than the distance between the initial position and the path.

7. Apparatus according to claim 6, wherein second proximity switches are disposed parallel to the second pistons, and wherein switching pulses of the second proximity switches control movement of the cutting bands after a cutting operation and control stopping of the cutting bands in the initial position.

8. Apparatus according to claim 6, further comprising:
a linear guide for the cutting bands arranged parallel to the second pistons.

9. Apparatus according to claim 3 wherein each cutting band is connected to the respective holding beam by means of insulators, one of the insulators is connected via a cutting band clamping unit and the other insulator is fixed directly to the holding beam.

10. Apparatus according to claim 9, wherein the cutting band clamping unit comprises a clamping block and a shaft having a compression spring mounted thereon, and one of the insulators is fixed to the clamping block.

11. Apparatus according to claim 9, wherein each holding beam has at one end a cut-out with a web, a holding device is positioned in the cut-out and is connected to the web by means of holding screws.

12. Apparatus according to claim 10, wherein the holding device has a linear ball bearing therein, the shaft is partially pushed longitudinally into the linear ball bearing, and the compression spring bears with one end against the linear ball bearing and another end against the clamping block.

* * * * *